(12) United States Patent
Osama

(10) Patent No.: US 11,710,991 B2
(45) Date of Patent: Jul. 25, 2023

(54) HIGH VOLTAGE ELECTRIC MACHINE EQUIPPED WITH GALVANIC SEPARATORS FOR CASCADED VOLTAGE STATOR MODULARIZATION

(71) Applicant: General Electric Company, Schenectady, NY (US)

(72) Inventor: Mohamed Osama, Garching (DE)

(73) Assignee: General Electric Company, Schenectady, NY (US)

( * ) Notice: Subject to any disclaimer, the term of this patent is extended or adjusted under 35 U.S.C. 154(b) by 367 days.

(21) Appl. No.: 17/001,807

(22) Filed: Aug. 25, 2020

(65) Prior Publication Data
US 2022/0069641 A1    Mar. 3, 2022

(51) Int. Cl.
*H02K 1/14* (2006.01)
*H02K 11/33* (2016.01)
(Continued)

(52) U.S. Cl.
CPC .......... *H02K 1/14* (2013.01); *H02J 1/12* (2013.01); *H02K 3/12* (2013.01); *H02K 3/28* (2013.01);
(Continued)

(58) Field of Classification Search
CPC .. H02K 1/14; H02K 3/12; H02K 3/28; H02K 3/521; H02K 5/02; H02K 5/08; H02K 7/14; H02K 11/33; H02K 16/04; H02K 1/16; H02K 1/182; H02K 1/185; H02K 1/04; H02K 16/00; H02K 2201/15; H02K 2213/06; H02K 2213/12; H02K 1/148; H02K 11/00; H02K 1/278; H02K 1/2793; H02K 5/04; H02J 1/12; H02J 2310/44; B64D 2221/00
See application file for complete search history.

(56) References Cited

U.S. PATENT DOCUMENTS 3,663,075 A * 5/1972 Kronenberg .......... F16C 39/063
310/90.5
6,265,804 B1 * 7/2001 Nitta ...................... H02K 1/148
310/43
(Continued)

FOREIGN PATENT DOCUMENTS

CN          104601003 A     5/2015
DE     102017217751 A1    11/2019
(Continued)

*Primary Examiner* — Ahmed Elnakib
(74) *Attorney, Agent, or Firm* — Dority & Manning, P.A.

(57) ABSTRACT

A high voltage electric machine and power distribution system including one or more of such electric machines are provided. In one aspect, a high voltage electric machine includes a stator, a rotor, and a housing encasing at least a portion of the stator and rotor. The stator is modularized into cascaded voltage stator modules. The stator modules are galvanically isolated from one another by intermodular separators. At least one intermodular separator is positioned between each adjacent pair of stator modules. The stator modules are also galvanically isolated from the housing by a housing separator. The housing separator is positioned between the stator modules and the housing. Each stator module has an associated set of windings that are wound only within their associated stator module.

20 Claims, 8 Drawing Sheets

(51) Int. Cl.

| | | |
|---|---|---|
| *H02J 1/12* | (2006.01) | |
| *H02K 3/12* | (2006.01) | |
| *H02K 3/28* | (2006.01) | |
| *H02K 3/52* | (2006.01) | |
| *H02K 5/02* | (2006.01) | |
| *H02K 5/08* | (2006.01) | |
| *H02K 7/14* | (2006.01) | |
| *H02K 16/04* | (2006.01) | |

(52) U.S. Cl.
 CPC .............. *H02K 3/521* (2013.01); *H02K 5/02* (2013.01); *H02K 5/08* (2013.01); *H02K 7/14* (2013.01); *H02K 11/33* (2016.01); *H02K 16/04* (2013.01); *B64D 2221/00* (2013.01); *H02J 2310/44* (2020.01)

(56) References Cited

U.S. PATENT DOCUMENTS

| | | | |
|---|---|---|---|
| 6,965,183 | B2 | 11/2005 | Dooley |
| 7,050,311 | B2 | 5/2006 | Lai et al. |
| 7,609,536 | B2 | 10/2009 | Brochu et al. |
| 7,710,081 | B2 | 5/2010 | Saban et al. |
| 7,960,948 | B2 | 6/2011 | Saban et al. |
| 8,212,371 | B2 | 7/2012 | Maibach et al. |
| 8,374,009 | B2 | 2/2013 | Feng et al. |
| 9,660,493 | B2 | 5/2017 | Anbarasu et al. |
| 10,020,717 | B2 * | 7/2018 | Sarlioglu ................ H02K 3/28 |
| 10,378,445 | B2 | 8/2019 | Edwards et al. |
| 2007/0046132 | A1 * | 3/2007 | Yamamoto ............ H02K 3/325 310/216.012 |
| 2007/0223258 | A1 | 9/2007 | Lai et al. |
| 2011/0070108 | A1 * | 3/2011 | Arita .................... H02K 21/046 310/46 |
| 2019/0044405 | A1 | 2/2019 | Calebrese et al. |
| 2019/0044451 | A1 * | 2/2019 | Huang ...................... H02J 3/46 |
| 2019/0372421 | A1 * | 12/2019 | Amaya ................... H02K 5/08 |

FOREIGN PATENT DOCUMENTS

| | | | |
|---|---|---|---|
| EP | 2157687 | A1 | 2/2010 |
| EP | 2685602 | A1 | 1/2014 |
| EP | 2702667 | B1 | 9/2017 |
| GB | 2480229 | A | 11/2011 |
| WO | WO9206527 | A1 | 4/1992 |
| WO | WO9207406 | A1 | 4/1992 |
| WO | WO2012/093942 | A1 | 7/2012 |
| WO | WO 2012093942 | * | 7/2012 |

* cited by examiner

HIGH VOLTAGE ELECTRIC MACHINE EQUIPPED WITH GALVANIC SEPARATORS FOR CASCADED VOLTAGE STATOR MODULARIZATION

FIELD

The present subject matter relates generally to high voltage electric machines.

BACKGROUND

Electrical power systems, such as those found in an aircraft power distribution systems, employ power generating systems or power sources, such as generators, for generating electricity for powering the systems and subsystems of the aircraft. As the electricity traverses electrical transmission cables to deliver power from the power sources to electrical loads, controllable power converters ensure that the power delivered to the electrical loads meets the designed power criteria for the loads or distribution system.

Hybrid electric propulsion systems transfer high voltage electrical power from engines to remote places on the aircraft. On some aircraft, transmission cables can span distances over 50 meters, e.g., from an electrical generator of an engine mounted to a wing to the tail end of the aircraft. The weight of such cables can be significant. To reduce the weight of such cables and consequently the weight of an aircraft, high voltage cables can be employed. While using high voltage cables can reduce the weight of transmission cables, high voltage electric machines positioned onboard aircraft can be subject to partial discharge inception voltage issues, particularly at altitudes greater than 40,000 ft. To prevent partial discharge issues, additional insulation is required, which adds complexity and weight to such aviation electric machines.

Accordingly, an electric machine and power distribution systems that address one or more of the challenges noted above would be useful.

BRIEF DESCRIPTION

Aspects and advantages of the invention will be set forth in part in the following description, or may be obvious from the description, or may be learned through practice of the invention.

In one aspect, an electric machine is provided. The electric machine includes a stator having stator modules. The electric machine also includes a housing encasing at least a portion of the stator. The electric machine further includes a housing separator galvanically isolating the housing from the stator modules. In addition, the electric machine includes intermodular separators galvanically isolating the stator modules from one another.

In another aspect, a power distribution system is provided. The power distribution system includes a high voltage power bus operable to carry high voltage electrical power. The power distribution system also includes power converters electrically coupled with the high voltage power bus and operable to segment the high voltage electrical power. In addition, the power distribution system includes an electric machine. The electric machine includes a stator having stator modules and a housing encasing at least a portion of the stator. Further, the electric machine includes a housing separator galvanically isolating the housing from the stator modules and intermodular separators galvanically isolating the stator modules from one another. Each one of the stator modules is electrically coupled with a respective one of the power converters, and wherein each one of the stator modules receives a portion of the segmented high voltage electrical power.

In another exemplary aspect, an aircraft is provided. The aircraft includes a high voltage power bus operable to carry high voltage electrical power. The aircraft also includes power converters electrically coupled with the high voltage power bus and operable to segment the high voltage electrical power. In addition, the aircraft includes an electric machine. The electric machine includes a stator having stator modules and a housing encasing at least a portion of the stator. Further, the electric machine includes a housing separator galvanically isolating the housing from the stator modules and intermodular separators galvanically isolating the stator modules from one another. Each one of the stator modules is electrically coupled with a respective one of the power converters, and wherein each of the stator modules receives a portion of the segmented high voltage electrical power and each of the stator modules is at an independent voltage with respect to the other stator modules.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
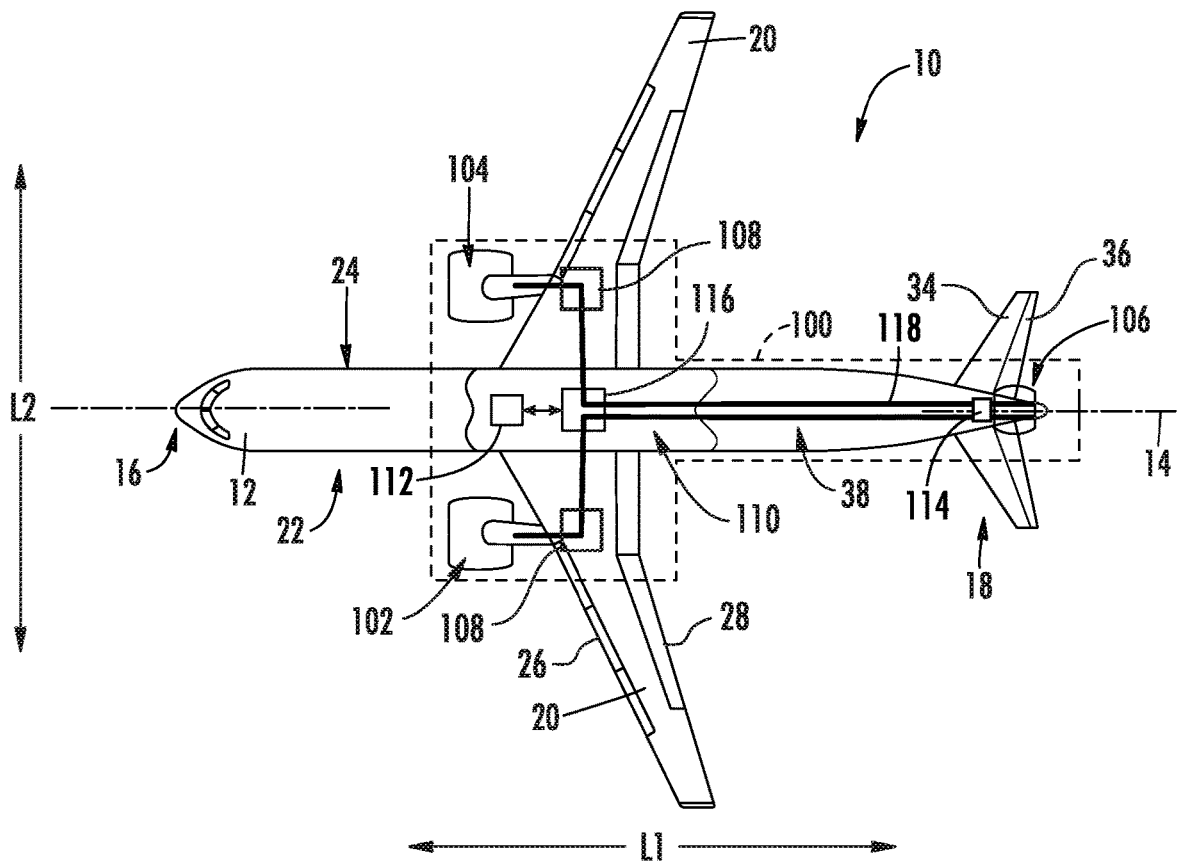
FIG. 1 provides a schematic top view of an example aircraft as may incorporate various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. As used herein, "high voltage" means 1 kV or greater. Further, as used herein, "electrically coupled" means electrically connected, directly or indirectly.

Aspects of the present disclosure are directed to high voltage rotating electric machines and power distribution systems including one or more of such high voltage rotating electric machines. In one aspect, a high voltage electric machine is provided. The electric machine can be rated for greater than 1 kV Direct Current (DC). The electric machine includes a stator, a rotor, and a housing encasing at least a portion of the stator and rotor. The rotor can be coupled with a shaft. The shaft and the rotor can be rotated about an axis of rotation. The stator is fixed relative to the rotor. The electric machine can be a radial flux electric machine or an axial flux electric machine, for example. Further, the electric machine can be an electric motor, an electric generator, or a combination motor/generator.

Notably, the stator is modularized into cascaded voltage stator modules. The stator modules are galvanically isolated from one another by intermodular separators. At least one intermodular separator is positioned between each adjacent pair of stator modules. Thus, the stator modules are galvanically isolated with respect to each other. Galvanic isolation of the stator modules prevents current flow between the stator modules; no direct conduction path is permitted but energy can still be exchanged between the stator modules by other means, such as rotating electromagnetic fields. The stator modules are also galvanically isolated from the housing by a housing separator. The housing can be at or almost at a grounded electrical potential for safety reasons, for example. For instance, a transmission line or cable can be connected to the housing at one end and connected to a ground point of power converters associated with the electric machine at its other end. As one example, the armor of the transmission cable can be electrically connected to the housing at one end and the ground point at its other end. As another example, a stranded ground wire of the transmission cable can be electrically connected to the housing at one end and the ground point at its other end. The housing separator is positioned between the stator modules and the housing. In this way, the stator modules are galvanically isolated from the housing. Moreover, each stator module has an associated set of windings that are wound only within their associated stator module.

The galvanic isolation and winding configuration associated with the stator modules allows the stator modules to "float" at independent different voltages without negatively affecting performance of the electric machine. As the stator modules float at different independent voltages, the slot ground-wall insulation for each stator module need only support the module voltage. Moreover, since each cascaded voltage stator module has low voltage across it, a number of advantages and benefits may be realized, especially for high voltage electric machines positioned onboard an aircraft operable at high altitudes, e.g., greater than 40,000 feet. For instance, the cascaded voltage modularization of the stator reduces the voltage between the windings and the stator such that each stator module can be below the Partial Discharge Inception Voltage (PDIV). Further, the slot fill factor can be increased by the use of low voltage slot ground-wall insulation, such as slot liners. In addition, the thermal barrier between conductor and stator iron can be reduced due to the lower insulation thermal resistance, making it more practical to indirectly liquid cool the high voltage electric machine compared to conventional high voltage machines. Also, more cooling techniques can be used for the present electric machine as less end-winding insulation is required. For instance, a spray end-winding liquid cooling technique can be used to cool components of the electric machine, which has not been practical for conventional high voltage electric machines due to the required thick end winding insulation.

In another aspect, the above-described high voltage electric machine is a component of a power distribution system for an aircraft. In some embodiments, high voltage electrical power can be generated by an electric generator operatively coupled with an engine of the aircraft. The high voltage electrical power (i.e., over 1 kV) can be transmitted over a power bus to remote electrical loads on the aircraft. The power bus can include high voltage transmission cables. In some instances, such transmission cables can span over 50 meters, e.g., from a wing to a tail end of the aircraft. The power bus can be a unipolar power bus or a bipolar power bus, for example.

The high voltage electrical power (i.e., over 1 kV) can be directed to the electric machine over the power bus. The electric machine can be associated with or can include a plurality of power converters. Each stator module of the electric machine can be electrically coupled with a respective one of the power converters. The power converters can be arranged in a cascade arrangement. The power converters are operable to segment the incoming high voltage electrical power into low voltage portions and distribute the low voltage electrical power to their respective stator modules. Each of the stator modules receives a portion of the segmented high voltage electrical power. In this way, each stator module has an associated independent low voltage. The galvanic isolation of the stator modules with respect to each other and with respect to the housing enables cascaded voltage stator modularization of the stator of the electric machine.

Figure 2:
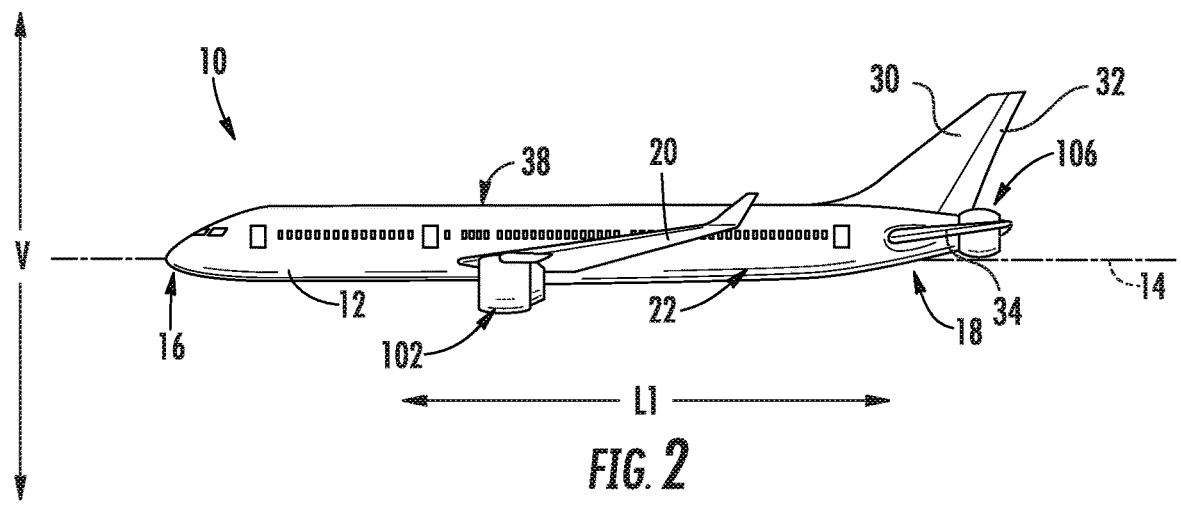
FIG. 2 provides a port side view of the aircraft of FIG. 1.

With reference now to FIGS. 1 and 2, FIG. 1 provides a schematic top view of an example aircraft 10 as may incorporate various embodiments of the present subject matter. FIG. 2 provides a port side view of the aircraft 10 of FIG. 1. As shown, the aircraft 10 defines a longitudinal direction L1, a lateral direction L2, and a vertical direction V. The aircraft 10 also defines a longitudinal centerline 14 that extends therethrough along the longitudinal direction L1. Generally, the aircraft 10 extends between a forward end 16 and an aft end 18 along the longitudinal direction L1.

As depicted, the aircraft 10 includes a fuselage 12 that extends longitudinally from the forward end 16 of the aircraft 10 to the aft end 18 of the aircraft 10. As used herein, the term "fuselage" generally includes all of the body of the aircraft 10, including the empennage of the aircraft 10. The aircraft 10 also includes a pair of wings 20. The first of such wings 20 extends outward along the lateral direction L2 with respect to the longitudinal centerline 14 from a port side 22 of the fuselage 12 and the second of such wings 20 extends outward along the lateral direction L2 with respect to the longitudinal centerline 14 from a starboard side 24 of the fuselage 12. Each of the wings 20 includes one or more leading edge flaps 26 and one or more trailing edge flaps 28. The aircraft 10 further includes a vertical stabilizer 30 having a rudder flap 32 for yaw control (FIG. 2), and a pair of horizontal stabilizers 34, each having an elevator flap 36 for pitch control (FIG. 1). The fuselage 12 additionally includes an outer surface or skin 38. It will be appreciated that the aircraft 10 may include other suitable configurations of stabilizers and control surfaces.

As further shown in FIGS. 1 and 2, the aircraft 10 includes a propulsion system 100. The exemplary propulsion system 100 includes one or more aircraft engines and one or more electric propulsion engines. Thus, the propulsion system 100 is a hybrid electric propulsion system in this example embodiment. As depicted, the propulsion system 100 includes a plurality of aircraft engines, each configured to be mounted to the aircraft 10, such as to one of the pair of wings 20, and an electric propulsion engine. More specifically, for the embodiment depicted, the aircraft engines are configured as gas turbine engines, or rather as turbofans 102, 104 attached to and suspended beneath the wings 20 in an under-wing configuration.

Additionally, the electric propulsion engine is configured to be mounted at the aft end 18 of the aircraft 10, and hence the electric propulsion engine depicted may be referred to as an "aft engine." Further, the electric propulsion engine depicted is configured to ingest and consume air forming a boundary layer over the fuselage 12 of the aircraft 10. Accordingly, the exemplary aft engine depicted may be referred to as a Boundary Layer Ingestion (BLI) fan 106. By ingesting and consuming air forming a boundary layer of the fuselage 12, the BLI fan 106 can reduce turbulence and thus drag on the aircraft 10, which ultimately reduces fuel consumption. The BLI fan 106 is mounted to the aircraft 10 at a location aft of the wings 20 and/or the turbofans 102, 104. Specifically, for the embodiment depicted, the BLI fan 106 is connected to the fuselage 12 at the aft end 18, such that the BLI fan 106 is incorporated into or blended with a tail section at the aft end 18. It should be appreciated, however, that in other embodiments the electric propulsion engine may be configured in any other suitable manner, and may not necessarily be configured as an aft fan or as a BLI fan.

For this embodiment, the propulsion system 100 further includes one or more electrical machines, such as electric generators 108 operatively coupled with respective turbofans 102, 104. For example, one or both of the turbofans 102, 104 may be configured to provide mechanical power from a rotating shaft (such as a low pressure shaft or high pressure shaft) to the electric generators 108. Although depicted schematically outside the respective turbofans 102, 104, in certain embodiments, the electric generators 108 may be positioned within a respective turbofan 102, 104, e.g., coupled with a spool or shaft of their respective turbofans 102, 104. The electric generators 108 may be configured to convert the mechanical power output by their associated turbofans 102, 104 into electrical power. For the embodiment depicted, the propulsion system 100 includes an electric generator 108 for each turbofan 102, 104.

The propulsion system 100 also includes a power distribution system 110. Generally, the power distribution system 110 is operable to distribute electrical power generated by one or more power sources, such as the electric generators 108, to one or more electrical loads, such as an energy storage device 112, an electric motor 114 operable to drive the BLI fan 106, and/or other aircraft systems. The power distribution system 110 can include power electronics 116, represented schematically in FIG. 1. The power electronics 116 can condition, transform, segment, and/or convert electrical power into a desired form. Electrical power can be routed to electrical loads via a power bus 118. For instance, electrical power can be routed via the power bus 118 to the energy storage device 112 to be stored and/or to the electric motor 114 so that the electric motor 114 can drive the BLI fan 106. Generally, the electric generators 108, the power electronics 116, the energy storage device 112, the electric motor 114, and other aircraft systems can be electrically coupled via the power bus 118. The power bus 118 can include transmission lines that extend from one of the wings 20 to the electric motor 114. In some embodiments, such transmission lines can span over 50 meters.

It will be appreciated that the aircraft 10 and the propulsion system 100 depicted in FIGS. 1 and 2 are provided by way of example only, and that in other exemplary embodiments, any other suitable aircraft 10 may be provided having a propulsion system 100 configured in any other suitable manner. For example, in other embodiments, the BLI fan 106 may alternatively be positioned at any suitable location proximate the aft end 18 of the aircraft 10. Further, in other embodiments, the electric propulsion engine may not be positioned at the aft end of the aircraft 10, and thus may not be configured as an "aft engine." For example, the electric propulsion engine may be incorporated into the fuselage of the aircraft 10, and thus configured as a "podded engine," or pod-installation engine. Further, in still other embodiments, the electric propulsion engine may be incorporated into a wing of the aircraft 10, and thus may be configured as a "blended-wing engine." Moreover, in other embodiments, the electric propulsion engine may not be a boundary layer ingestion fan, and instead may be mounted at any suitable location on the aircraft 10 as a freestream injection fan. In addition, although turbofans 102, 104 are shown in FIGS. 1 and 2, it will be appreciated that the present subject matter may be applicable to other types of turbomachinery and aviation gas turbine engines. For example, the present subject matter may be suitable for use with or in turboprops, turboshafts, turbojets, industrial and marine gas turbine engines, and/or auxiliary power units.

Figure 3:
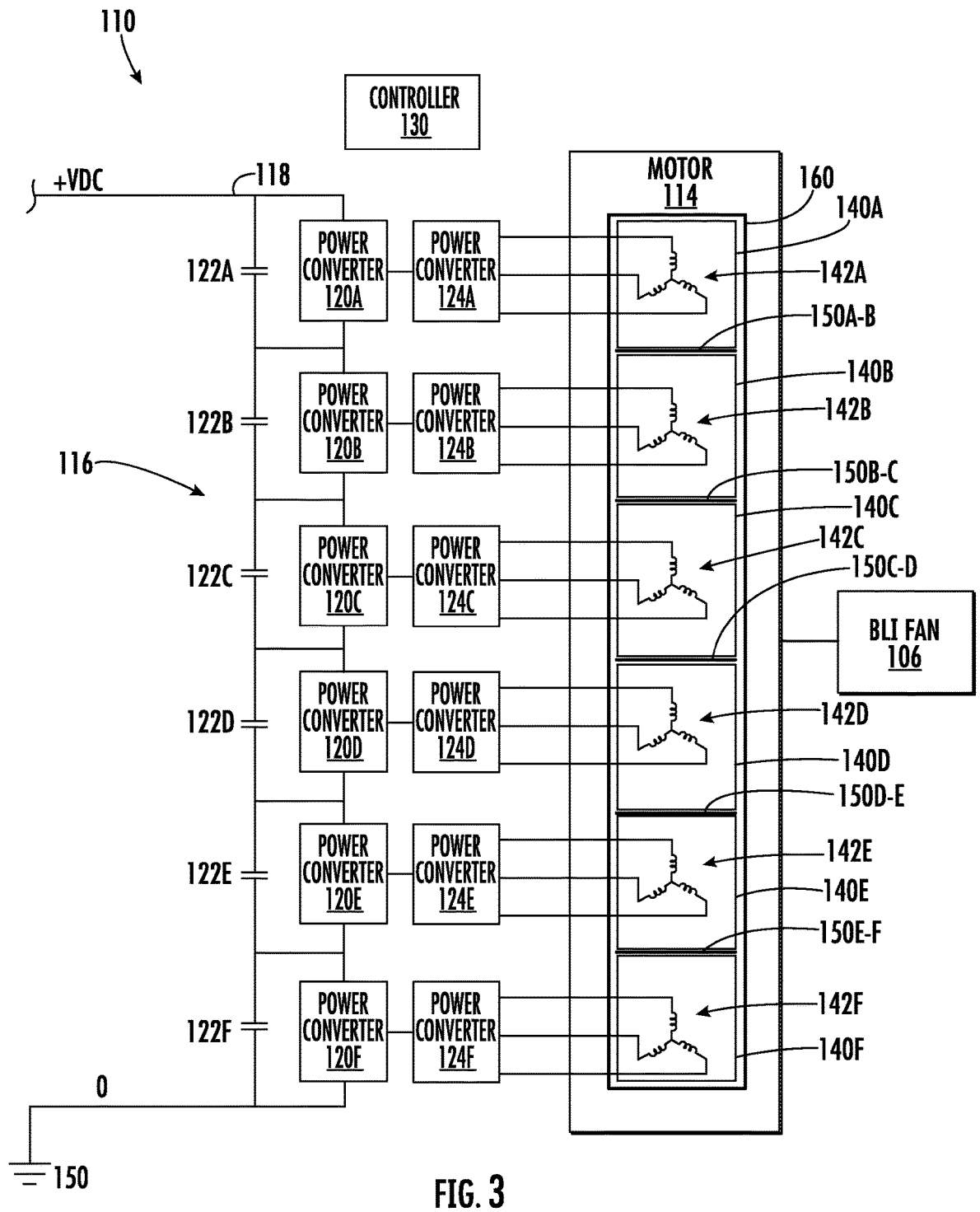
FIG. 3 provides a schematic view of a power distribution system of the aircraft of FIGS. 1 and 2.

FIG. 3 provides a schematic view of a portion of the power distribution system 110 of FIGS. 1 and 2. As noted above, high voltage electrical power from a power source can be transmitted over the power bus 118, e.g., over transmission cables of the power bus 118. For instance, electrical power having a voltage greater than 1 kV DC-Link can be transmitted over the power bus 118. For this embodiment, the power bus 118 is a unipolar power bus represented by the "+VDC" and "0" notations in FIG. 3. The unipolar power bus 118 and/or other components of the power distribution system can be electrically grounded by a grounding system 150, such as an aircraft grounding system. For instance, on an aircraft having a high electrically conductive fuselage (e.g., an aluminum fuselage), the grounding system 150 can be the fuselage itself. On an aircraft having a fuselage having an insulating or low electrically conductive fuselage (e.g., a carbon fiber fuselage), an internal metallic structure within the fuselage or other components of the aircraft, such as the wings, tail cone, or empennage of the aircraft, can be used for the grounding system 150. The high voltage electrical power can be generated by one or both of the electric generators 108 (FIG. 1) mechanically coupled with their respective turbofans 102, 104 (FIG. 1), for example.

The power electronics 116 can include a plurality of power converters 120A-120F associated with the electric motor 114. The power converters 120A-120F associated with the electric motor 114 can be components of the electric motor 114 or can be separate components from the electric motor 114. As depicted, the power converters 120A-120F are arranged in cascade or in a cascade arrangement. In some embodiments, the power converters 120A-120F are components of a single power converter associated with the electric motor 114.

Each power converter 120A-120F is in parallel with an associated capacitor. For instance, a first power converter 120A is in parallel with a first capacitor 122A, a second power converter 120B is in parallel with a second capacitor 122B, a third power converter 120C is in parallel with a third capacitor 122C, a fourth power converter 120D is in parallel with a fourth capacitor 122D, a fifth power converter 120E is in parallel with a fifth capacitor 122E, and a sixth power converter 120F is in parallel with a sixth capacitor 122F.

Generally, the power converters 120A-120F receive the high voltage electrical power and segment the high voltage electrical power into low voltage portions or predetermined quantities. A controller 130 of the power distribution system 110 can control the power converters 120A-120F to segment the high voltage electrical power into low voltage portions or predetermined quantities. The controller 130 can include one or more processors and one or more memory devices, for example. The one or more memory devices can include one or more non-transitory computer-readable medium. The one or more memory devices can store instructions that, when executed by the one or more processors, cause the one or more processors to perform operations. Operations can include monitoring and controlling the power converters 120A-120F, for example. Each power converter 120A-120F can include or be associated with one or more sensors. The sensors outputs can be provided to the controller 130 and the controller 130 can control the power converters 120A-120F based at least in part on the sensor outputs.

Once the high voltage electrical power is segmented by a given power converter 120A-120F, a power converter (e.g., an inverter) associated with the given power converter can convert the low voltage portion of DC electrical power into Alternating Current (AC) electrical power. For instance, a first inverter 124A can convert the low voltage DC electrical power output by the first power converter 120A into low voltage AC electrical power, a second inverter 124B can convert the low voltage DC electrical power output by the second power converter 120B into low voltage AC electrical power, a third inverter 124C can convert the low voltage DC electrical power output by the third power converter 120C into low voltage AC electrical power, a fourth inverter 124D can convert the low voltage DC electrical power output by the fourth power converter 120D into low voltage AC electrical power, a fifth inverter 124E can convert the low voltage DC electrical power output by the fifth power converter 120E into low voltage AC electrical power, and a sixth inverter 124F can convert the low voltage DC electrical power output by the sixth power converter 120F into low voltage AC electrical power. The inverters 124A-124F associated with the electric motor 114 can be components of the electric motor 114 or can be separate components from the electric motor 114. In some embodiments, the inverters 124A-124F are components of a single inverter or power converter associated with the electric motor 114.

Notably, the power converters 120A-120F, 124A-124F are each associated with a respective segmented stator module 140A-140F of a stator of the electric motor 114. Each stator module 140A-140F has an associated set of stator windings. For instance, a first stator module 140A has an associated first set of stator windings 142A, a second stator module 140B has an associated second set of stator windings 142B, a third stator module 140C has an associated third set of stator windings 142C, a fourth stator module 140D has an associated fourth set of stator windings 142D, a fifth stator module 140E has an associated fifth set of stator windings 142E, and a sixth stator module 140F has an associated sixth set of stator windings 142F. The low voltage portions of electrical power segmented by the power converters 120A-120F and inverted by the inverters 124A-124F are directed to the respective sets of stator windings 142A-142F. The electrical power directed to the stator windings can ultimately be used to drive the BLI fan 106 operatively coupled with the electric motor 114.

As will be explained in detail below, in accordance with the inventive aspects of the present disclosure, the sets of stator windings 142A-142F are wound only within their respective stator modules 140A-140F. Moreover, notably, the stator modules 140A-140F are galvanically isolated from one another by intermodular galvanic separators. For instance, a first intermodular separator 150A-B galvanically separates the first stator module 140A and the second stator module 140B, a second intermodular separator 150B-C galvanically separates the second stator module 140B and the third stator module 140C, a third intermodular separator 150C-D galvanically separates the third stator module 140C and the fourth stator module 140D, a fourth intermodular separator 150D-E galvanically separates the fourth stator module 140D and the fifth stator module 140E, a fifth intermodular separator 150E-F galvanically separates the fifth stator module 140E and the sixth stator module 140F, and for radial flux electric machines, although not shown, a sixth intermodular separator can galvanically separate the sixth stator module 140F and the first stator module 140A. In addition, the stator modules are galvanically isolated from a housing of the electric motor 114 by a housing separator 160 as shown in FIG. 3. The housing of the motor 114 can be at or almost at an electrically grounded potential, for example. As the stator modules 140A-140F are galvanically isolated from one another and the housing of the motor 114, the stator modules 140A-140F are "floating" iron stator modules. Accordingly, the stator modules 140A-140F act functionally as independent electric machines. Example embodiments of electric machines equipped with galvanic separators for cascaded voltage stator modularization are provided below.

Figure 4:
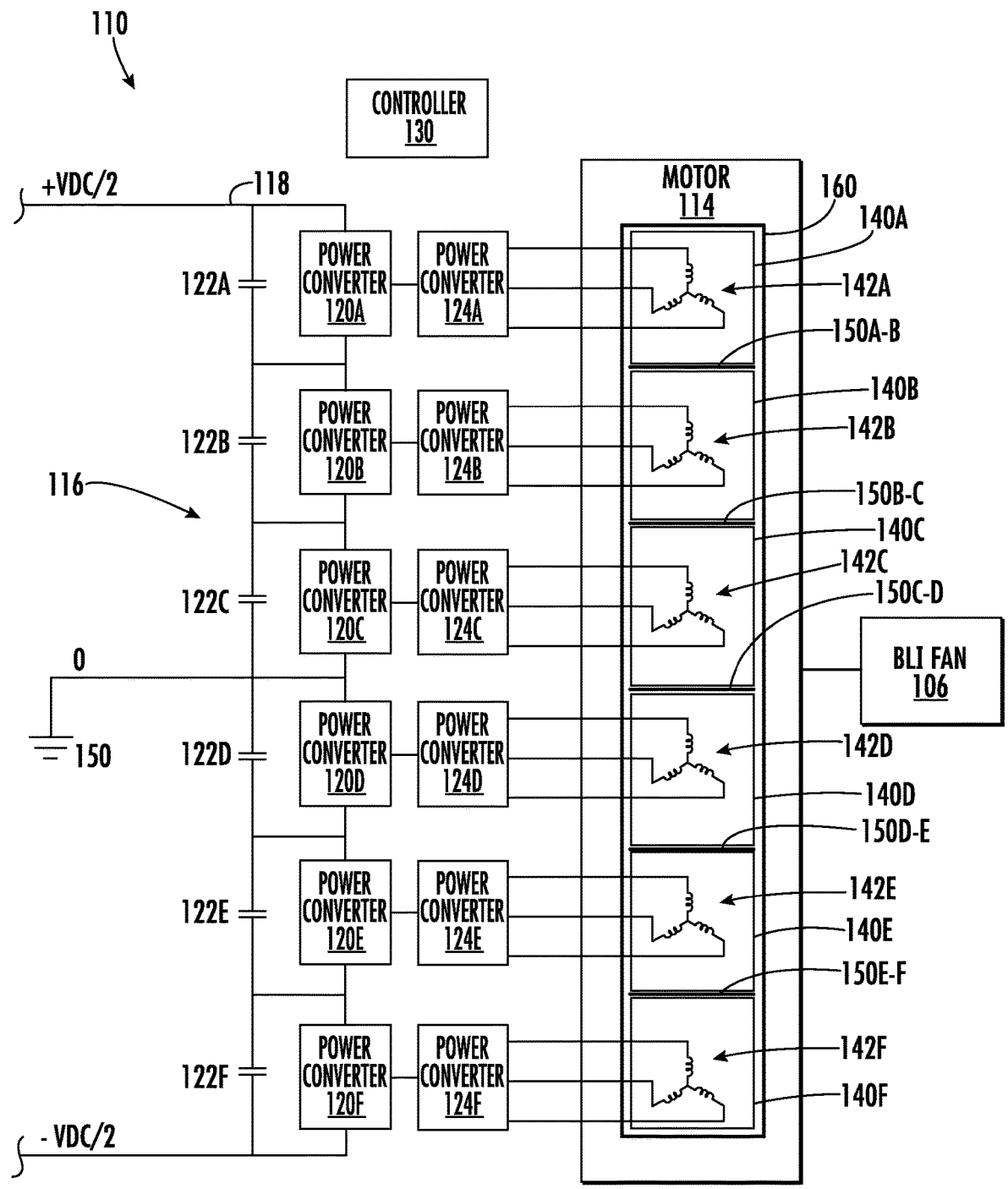
FIG. 4 provides a schematic view of an alternative power distribution system for the aircraft of FIGS. 1 and 2.

FIG. 4 provides a schematic view of an alternative power distribution system 100 for the aircraft of FIGS. 1 and 2. The power distribution system 100 is configured in the same manner as the power distribution system of FIG. 3 except as noted below. For this embodiment, the power bus 118 is a bipolar power bus represented by the "+VDC/2" and "−VDC/2" transmission line notations in FIG. 4 as well as the reference or "0" notation. The bipolar power bus 118 and/or other components of the power distribution system can be electrically grounded by a grounding system 150, such as an aircraft grounding system. The high voltage electrical power can be generated by one or both of the electric generators 108 (FIG. 1) mechanically coupled with their respective turbofans 102, 104 (FIG. 1), for example. The high voltage electrical power can be provided to the electric motor 114.

Figure 5:
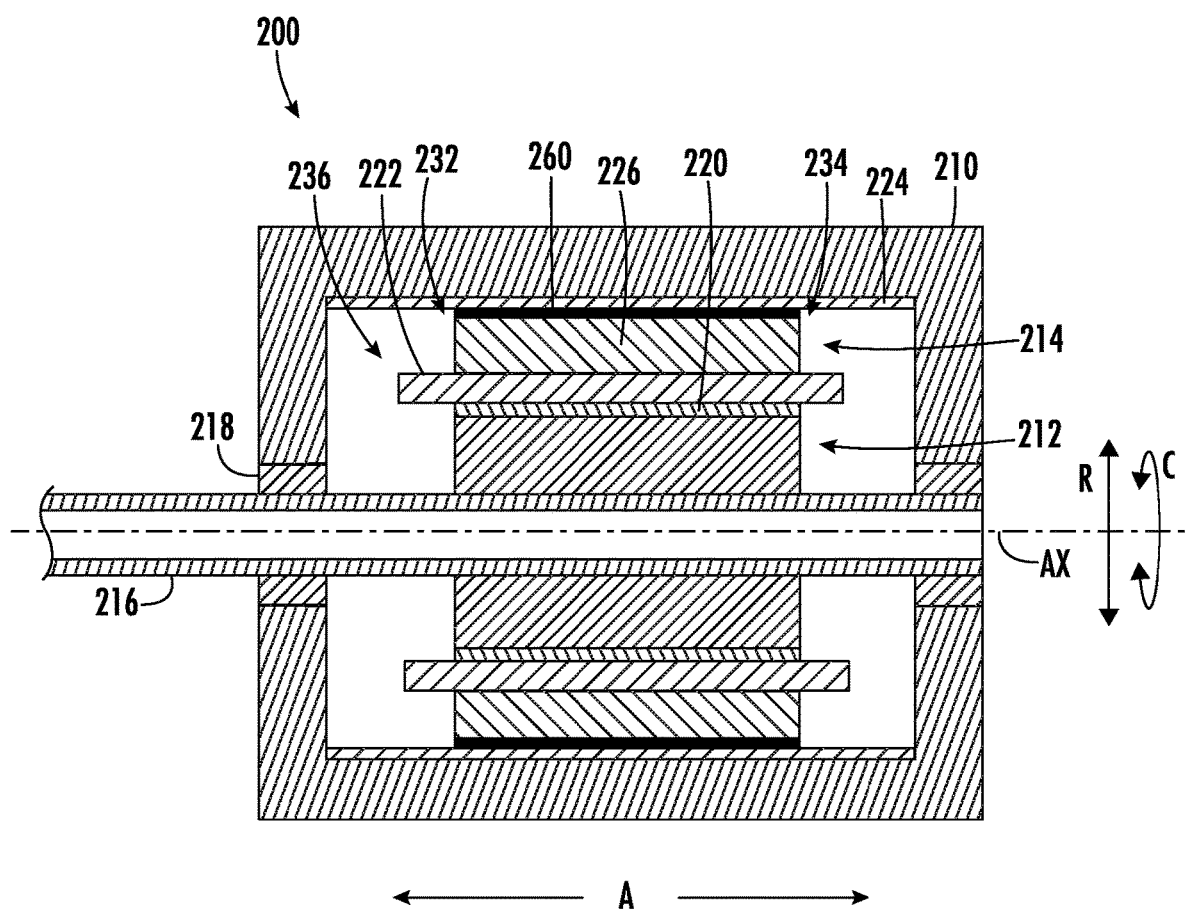
FIG. 5 provides a schematic cross-sectional view of an example electric machine according to one example embodiment of the present subject matter.

FIG. 5 provides a schematic cross-sectional view of an electric machine 200 according to an example embodiment of the present subject matter. The electric motor 114 of the power distribution system 110 of FIG. 3 or FIG. 4 can be configured in the same or similar manner as the electric machine 200 of FIG. 5, for example. For reference, the electric machine 200 defines an axial direction A, a radial direction R, and a circumferential direction C. The electric machine 200 also defines an axis of rotation AX.

As depicted, the electric machine 200 of FIG. 5 is a radial flux rotating electric machine. The electric machine 200 includes a housing 210. The housing 210 is a hollow, substantially cylindrically-shaped housing in this example embodiment. The housing 210 can be at or almost at a grounded electrical potential for safety reasons. For instance, a transmission line or cable can be electrically connected to the housing 210 at one end and electrically connected to a ground point (e.g., the grounding system 150 of FIG. 3 or 4) of the power converters (e.g., 120A-120F and 124A-124F of FIG. 3 or 4) associated with the electric machine 200 at its other end. As one example, the armor of the transmission cable can be electrically connected to the housing 210 at one end and the ground point at its other end. As another example, a stranded ground wire of the transmission cable can be electrically connected to the housing 210 at one end and the ground point at its other end.

The electric machine 200 also includes a rotor 212 and a stator 214 encased within the housing 210. The rotor 212 is operatively coupled with a shaft 216. The shaft 216 is supported by the housing 210 via one or more bearings 218. The shaft 216 can be any suitable shaft, e.g., a drive shaft. The shaft 216 is rotatable about the axis of rotation AX. The rotor 212 is rotatable in unison with the shaft 216 about the axis of rotation AX. The stator 214 is fixed relative to the rotor 212 and the shaft 216. The stator 214 extends between a first end 232 and a second end 234 along the axial direction A.

The stator 214 has associated polyphase AC stator windings 222. The stator windings 222 are wound axially through slots defined by the stator 214. The end turns or end windings 236 of the stator windings 222 are positioned adjacent to the end surfaces of the stator 214, e.g., at the first end 232 and at the second end 234 as shown in FIG. 5. The stator windings 222 are electrically coupled with a power source, such as a power converter. In this manner, electrical power can be transmitted to the windings 222, and as will be appreciated, the electrical energy can be converted into mechanical energy in motoring mode or vice versa in generating mode. The rotor 212 has associated rotor components 220 for creating a rotor magnetic field in order to couple to the stator magnetic field to enable energy conversion. Depending on the type of AC polyphase electric machine, the rotor components 220 can be rotor magnets in case of a permanent magnet synchronous machine, a squirrel cage in case of an induction machine, or a field winding in case of a field wound synchronous machine.

In some embodiments, the electric machine 200 includes a cooling system, e.g., for cooling various components of the electric machine 200. As one example, the cooling system can include a cooling jacket 224. The cooling jacket 224 can be integral with the housing 210 or can be a separate component connected thereto. A coolant can flow through a conduit disposed within the cooling jacket 224 to cool components of the electric machine 200. In other embodiments, the cooling system can be an air cooling system. The air cooling system can include one or more cooling openings defined in the endbells of the housing 210. In this manner, air can flow through the openings and air cool components of the electric machine 200. The electric machine 200 can include other suitable types of cooling systems in addition or alternatively to the disclosed example cooling systems.

Although the electric machine 200 has been described and illustrated in FIG. 5 as having a particular configuration, it will be appreciated that the inventive aspects of the present disclosure may apply to electric machines having alternative configurations. For instance, in some alternative embodiments, the inventive aspects of the present disclosure can apply to axial flux rotating electric machines.

Figure 6:
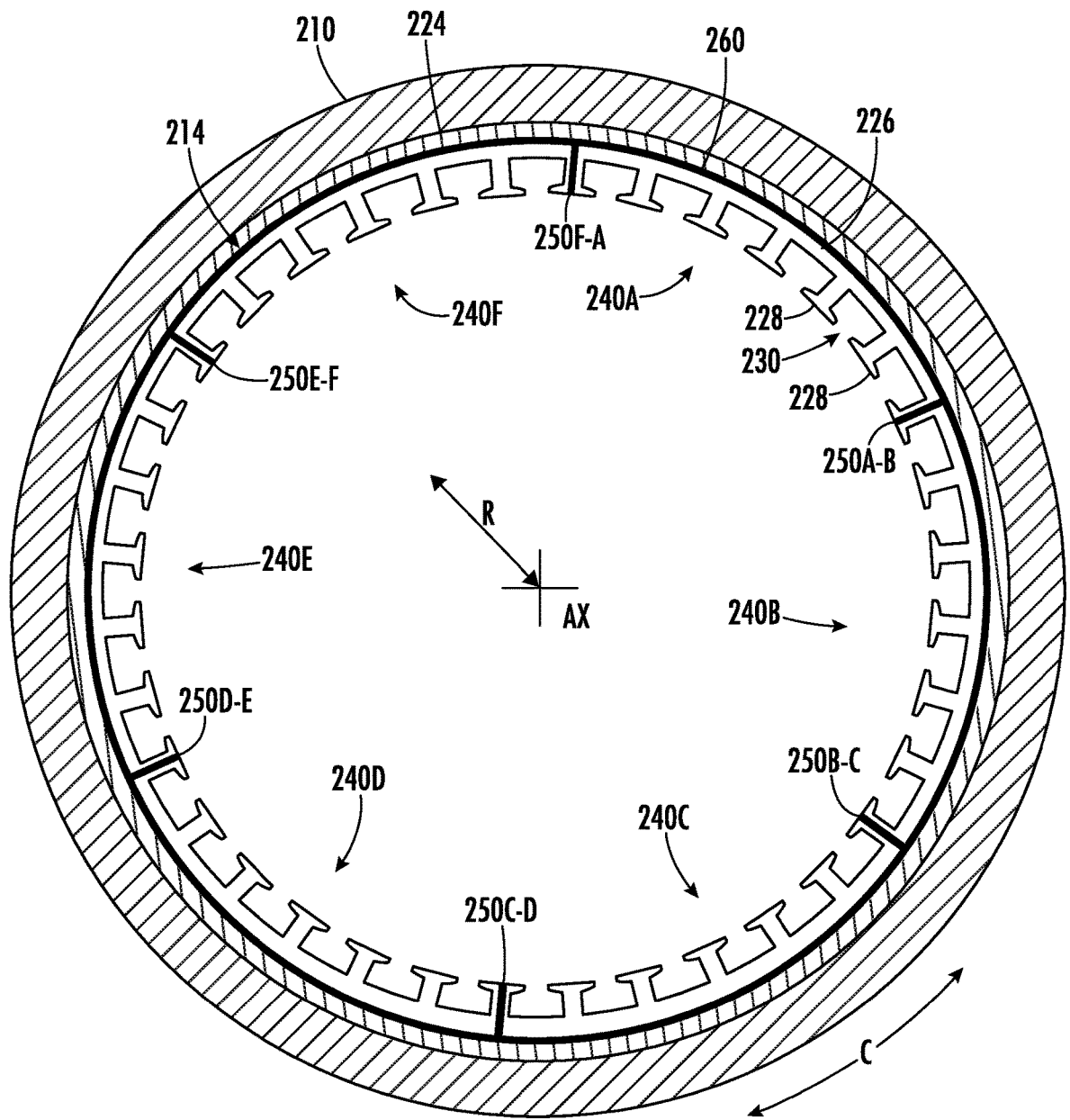
FIG. 6 provides an axial cross-sectional view of a stator and other components of the electric machine of FIG. 5.

FIG. 6 provides an axial cross-sectional view of the stator 214 and other components of the electric machine 200 of FIG. 5. As shown, the stator 214 includes a stator core having a core body 226 and a plurality of teeth 228 projecting from the core body 226. For this embodiment, the teeth 228 project inward from the core body 226 along the radial direction R toward the axis of rotation AX. Slots 230 are defined between each of the teeth 228. The slots 230 are sized to receive stator windings (not shown in FIG. 6).

Notably, the stator 214 has cascaded voltage stator modules 240A-240F galvanically isolated from each other by galvanic intermodular separators 250A-B-250F-A. The stator modules 240A-240F are also galvanically isolated from the housing 210 by a housing separator 260. In this regard, as will be explained further below, the stator modules 240A-240F can "float" at independent voltages without negatively affecting the performance of the electric machine 200. For this embodiment, the stator 214 includes a first stator module 240A, a second stator module 240B, a third stator module 240C, a fourth stator module 240D, a fifth stator module 240E, and a sixth stator module 240F. In other embodiments, the stator 214 can have more or less than six modules.

As noted, a galvanic intermodular separator separates each adjacent pair of stator modules. For instance, as shown in FIG. 6, a first intermodular separator 250A-B galvanically separates the first stator module 240A and the second stator module 240B. A second intermodular separator 250B-C galvanically separates the second stator module 240B and the third stator module 240C. A third intermodular separator 250C-D galvanically separates the third stator module 240C and the fourth stator module 240D. A fourth intermodular separator 250D-E galvanically separates the fourth stator module 240D and the fifth stator module 240E. A fifth intermodular separator 250E-F galvanically separates the fifth stator module 240E and the sixth stator module 240F. And finally, a sixth intermodular separator 250F-A galvanically separates the sixth stator module 240F and the first stator module 240A. Accordingly, an intermodular separator is positioned between consecutive or adjacent stator modules and each stator module spans between intermodular separators. The intermodular separators 250A-B-250F-A are positioned between their respective stator modules 240A-240F such that the stator modules 240A-240F are separated from one another along the circumferential direction C.

For this embodiment, the intermodular separators 250A-B-250F-A each extend along the radial direction R from an outer surface of the core body 226 to an inner end of one of the teeth 228 as shown in FIG. 6. Accordingly, the intermodular separators 250A-B-250F-A each extend the entire radial length of the stator 214 along the radial direction R, wherein the radial length is defined as a length extending from the outer surface of the core body 226 to the inner end of one of the teeth 228 along the radial direction. In addition, the intermodular separators 250A-B-250F-A each extend the entire length of the stator 214 along the axial direction A (into and out of the page in FIG. 6). In this way, each intermodular separator 250A-B-250F-A is applied on the entire surface(s) separating two consecutive stator modules. The intermodular separators 250A-B-250D-E each have a thickness along the circumferential direction C. The intermodular separators 250A-B-250F-A can be in the form of a tape, a strip, a paint, or deposited as a powder, e.g., by Electrostatic Powder Deposition (EPD). In some embodiments, the intermodular separator 250A-B-250F-A can be 3D printed with a suitable material along with the electrically conductive stator 214.

The intermodular separators 250A-B-250F-A can be formed of any suitable material that can galvanically isolate consecutive or adjacent stator modules. Further, in some embodiments, the intermodular separators 250A-B-250F-A are formed of a ferromagnetic material. Ferromagnetic materials may prevent negative impacts to electric machine performance due to the intermodular separators creating airgaps between the stator modules. Airgaps typically result in an undesired magneto-motive force (mmf) drop. In addition, in some embodiments, the intermodular separators 250A-B-250F-A are formed of a dielectric material to withstand the voltage difference between two consecutive stator modules as well as a high electric resistivity to prevent intermodular electric current flow. Accordingly, in some embodiments, the intermodular separators can be formed of barium ferrite. Moreover, the intermodular separators 250A-B-250F-A can each have a suitable thickness that allows them to withstand the voltage difference between their respective consecutive modules. In some embodiments, the intermodular separators 250A-B-250F-A each have a thickness in a range of 25-250 microns (1-10 mils), wherein the thickness is measured along the circumferential direction C for radial flux electric machines.

As noted above, the stator modules 240A-240F are galvanically isolated from the housing 210 by the housing separator 260. As noted above, the housing 210 can be at or almost at a grounded electrical potential, e.g., for safety reasons. As shown in FIGS. 5 and 6, the housing separator 260 extends annularly around the stator 214 along the circumferential direction C and is positioned between the stator modules 240A-240F and the housing 210 along the radial direction R. In some embodiments, as shown in FIGS. 5 and 6, the housing separator 260 is positioned between the stator modules 240A-240F and the cooling jacket 224, which is in turn positioned between the housing separator 260 and the housing 210 along the radial direction R. The housing 210 can contact the cooling jacket 224, and thus, the cooling jacket 224 can also be at or almost at a grounded electrical potential. The cooling jacket 224 can contact the housing separator 260, which in turn contacts the stator modules 240A-240F. The housing separator 260 can be attached to at least one of the stator 214, the housing 210, and the cooling jacket 224. In some embodiments, the housing separator 260 is assembled between but is not attached to any structure. In other embodiments, the housing 210 can directly contact the housing separator 260, which in turn contacts the stator modules 240A-240F.

Moreover, the housing separator 260 can extend between the first end 232 and the second end 234 of the stator 214 along the axial direction A. In this manner, in some embodiments, the housing separator 260 can have a ring or an open cylindrical shape (i.e., a cylinder with no ends). In some embodiments, the housing separator 260 has a thickness in a range of 250 microns-2.5 mm (10-100 mils), wherein the thickness is measured along the radial direction R for radial flux electric machines.

Generally, the housing separator 260 can be formed of a material having the same or similar characteristics as the intermodular separators 250A-B-250F-A. In some embodiments, for instance, the housing separator 260 is formed of a dielectric material so that the housing separator 260 is able to withstand the voltage difference between each of the floating stator modules 240A-240F and the housing 210. In addition, in such embodiments, the housing separator 260 is formed of a material having a high electric resistivity to prevent electrical current from flowing between the stator modules 240A-240F and the housing 210. Accordingly, as one example, the housing separator 260 is formed of barium ferrite. The housing separator 260 can be formed of other suitable materials as well.

During operation of the electric machine 200, the stator modules 240A-240F can have or "float" at different independent voltages. As one example, suppose a high voltage DC bus delivers high voltage electrical power at 1.8 kV to the electric machine 200 and its associated power converters. Further suppose that the housing 210 can be at or almost at a grounded electrical potential. Also suppose that the DC bus is a unipolar DC bus such that at least one transmission line is set at "0" or a reference voltage and at least one transmission line is set positive (+VDC), e.g., as shown in FIG. 3. Further suppose the power converters associated with the electric machine 200 segment the incoming high voltage electrical power such that a first power converter associated with the first stator module 240A segments the high voltage electrical power into a portion having a voltage range between 0 and 300 V, a second power converter associated with the second stator module 240B segments the high voltage electrical power into a portion having a voltage range between 300 and 600 V, a third power converter associated with the third stator module 240C segments the high voltage electrical power into a portion having a voltage range between 600 and 900 V, a fourth power converter associated with the fourth stator module 240D segments the high voltage electrical power into a portion having a voltage range between 900 and 1200 V, a fifth power converter associated with the fifth stator module 240E segments the high voltage electrical power into a portion having a voltage range between 1200 and 1500 V, and a sixth power converter associated with the sixth stator module 240F segments the high voltage electrical power into a portion having a voltage range between 1500 and 1800 V.

Consequently, the first stator module 240A has an associated voltage range between 0 and 300 V, the second stator module 240B has a voltage range between 300 and 600 V, the third stator module 240C has a voltage range between 600 and 900 V, the fourth stator module 240D has a voltage range between 900 and 1200 V, the fifth stator module 240E has a voltage range between 1200 and 1500 V, and the sixth stator module 240F has a voltage range between 1500 and 1800 V. Accordingly, in this example, the maximum voltage between a stator module and a winding thereof is 300V DC-Link. In addition, the maximum voltage between a stator module and its associated power converter is 300V DC-Link. In this way, the voltage associated with the stator modules is kept at low voltage, which reduces or eliminates partial discharge issues, particularly when the electric machine 200 is operating at altitudes greater than 40,000 feet.

As another example, suppose a high voltage DC bus delivers high voltage electrical power at 1.8 kV to the electric machine 200 and its associated power converters. Further suppose that the housing 210 can be at or almost at a grounded electrical potential. Also suppose that the DC bus is a bipolar DC bus such that at least one transmission line is set negative (−VDC/2) and at least one transmission line is set positive (+VDC/2), e.g., as shown in FIG. 4. Further suppose the power converters associated with the electric machine 200 segment the incoming high voltage electrical power such that a first power converter associated with the first stator module 240A segments the high voltage electrical power into a portion having a voltage range between −900 and −600 V, a second power converter associated with the second stator module 240B segments the high voltage electrical power into a portion having a voltage range between −600 and −300 V, a third power converter associated with the third stator module 240C segments the high voltage electrical power into a portion having a voltage range between −300 and 0 V, a fourth power converter associated with the fourth stator module 240D segments the high voltage electrical power into a portion having a voltage range between 0 and 300 V, a fifth power converter associated with the fifth stator module 240E segments the high voltage electrical power into a portion having a voltage range between 300 and 600 V, and a sixth power converter associated with the sixth stator module 240F segments the high voltage electrical power into a portion having a voltage range between 600 and 900 V.

As a result, the first stator module 240A has an associated voltage range between −900 and −600 V, the second stator module 240B has a voltage range between −600 and −300 V, the third stator module 240C has a voltage range between −300 and 0 V, the fourth stator module 240D has a voltage range between 0 and 300 V, the fifth stator module 240E has a voltage range between 300 and 600 V, and the sixth stator module 240F has a voltage range between 600 and 900 V. Accordingly, in this example, the maximum voltage between a stator module and a winding thereof is 300V DC-Link. In addition, the maximum voltage between a stator module and its associated power converter is 300V DC-Link. In this way, the voltage associated with the stator modules is kept at low voltage, which reduces or eliminates partial discharge issues, particularly when the electric machine 200 is operating at altitudes greater than 40,000 feet as noted above.

Further, in this example, suppose that the housing 210 is electrically grounded and thus has an associated voltage of 0 V. In such an example, a voltage associated with the housing 210 (e.g., 0 V) is a median value between a maximum voltage (900 V) associated with a highest voltage stator module (e.g., the sixth stator module 240F) and a lowest voltage (−900 V) associated with the lowest voltage stator module (e.g., the first stator module 240A). The highest voltage stator module can be defined as the stator module having an associated voltage range higher than any other voltage range associated with any other one of the stator modules, e.g., the sixth stator module 240F in the example above, and a lowest voltage stator module can be defined as a stator module having an associated voltage range lower than any other voltage range associated with any other one of the stator modules, e.g., the first stator module 240A in the example above. Accordingly, in a bipolar configuration, the differential between the housing 210 and the maximum voltage of any of the stator modules is half that of the differential between the housing 210 and the maximum voltage of any of the stator modules in a unipolar configuration. In this way, the thickness of a housing-modular separator used in a bipolar configuration can be reduced or need not be as thick as a housing-modular separator used in a unipolar configuration, all other variables remaining the same.

Figure 7:
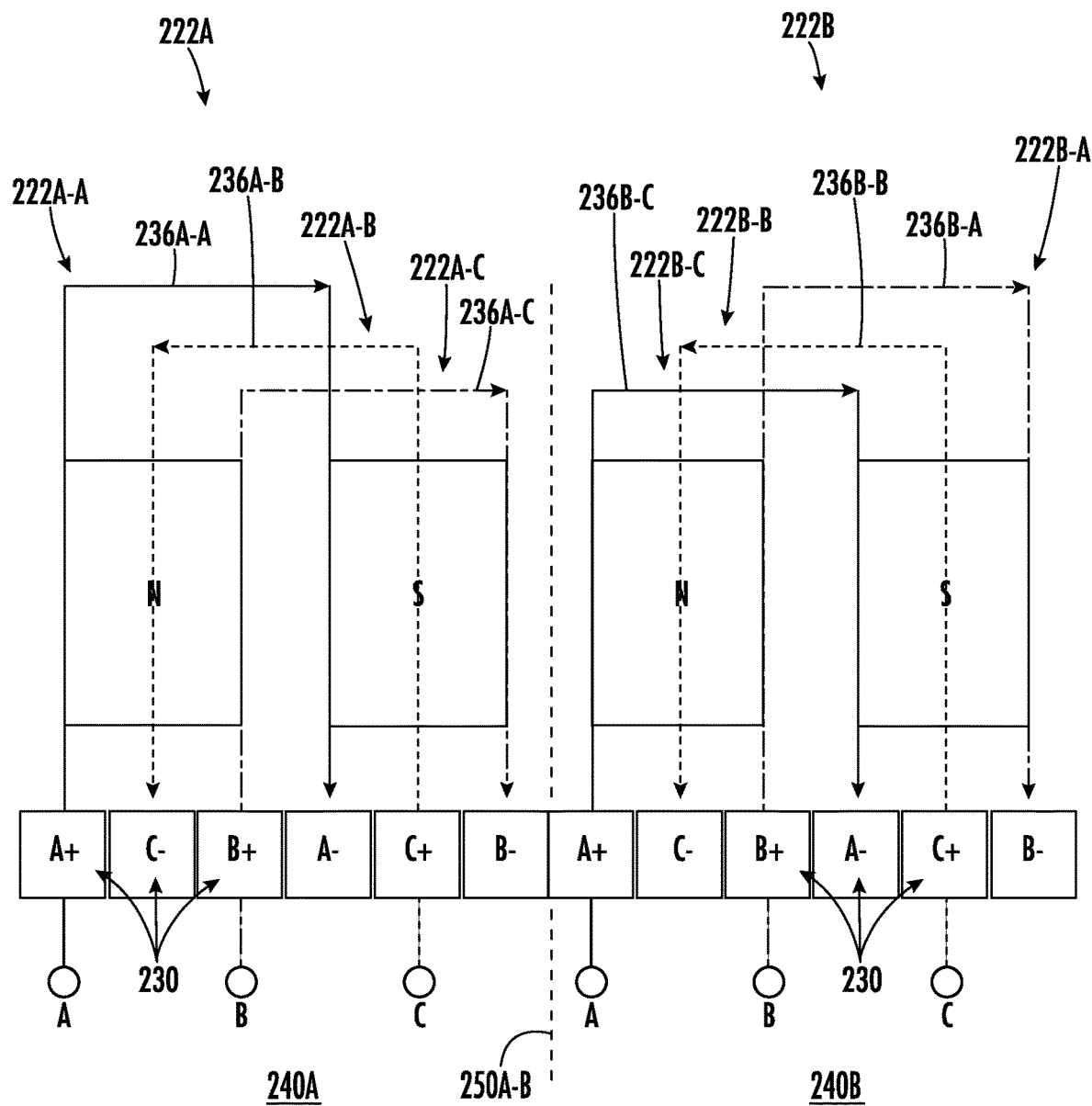
FIG. 7 provides a schematic view of an example winding configuration for two of the stator modules of the stator of FIG. 6.

FIG. 7 provides a schematic view of an example winding configuration for the first stator module 240A and the second stator module 240B of the electric machine 200. It will be appreciated that the other stator modules 240C, 240D, 240E, and 240F (FIG. 6) can have stator windings wound in the same or similar winding configurations shown for the first and second stator modules 240A, 240B. In FIG. 7, the first intermodular separator 250A-B (represented schematically by the dashed line) galvanically isolates the first and second stator modules 240A, 240B from one another.

Each stator module has an associated set of stator windings. For instance, as shown in FIG. 7, the first stator module 240A has an associated set of stator windings 222A and the second stator module 240B has an associated set of stator windings 222B. Although not shown, the stator modules 240C, 240D, 240E, and 240F likewise each have an associated set of stator windings. Notably, the stator windings of each set are wound only within their respective stator modules. That is, all windings of a given set of stator windings "go" and "return" in the same stator module. In this way, the stator modules 240A-240F are effectively electromagnetically independent electric machines. Moreover, as the stator windings of each set are wound only within their respective stator modules, the voltage potential between windings is kept at low voltage and the voltage potential between the windings and their respective stator modules are kept at low voltage.

By way of example, as shown in FIG. 7, the set of stator windings 222A associated with the first stator module 240A includes one or more first windings 222A-A associated with a first phase A, one or more second windings 222A-B associated with a second phase B, and one or more third windings 222A-C associated with a third phase C. Accordingly, in this example, the first stator module 240A acts as an independent three-phase electric machine. A go-side of the first winding 222A-A goes through one of the slots 230 labeled as A+, turns at end winding 236A-A, and a return-side of the first winding 222A-A returns through one of the slots 230 labeled as A−. Similarly, a go-side of the second winding 222A-B goes through one of the slots 230 labeled as B+, turns at end winding 236A-B, and a return-side of the second winding 222A-B returns through one of the slots 230 labeled as B−. Likewise, a go-side of the third winding 222A-C goes through one of the slots 230 labeled as C+, turns at end winding 236A-C, and a return-side of the third winding 222A-C returns through one of the slots 230 labeled as C−. The order of the stator windings 222A-A, 222A-B, and 222A-C gives the first stator module 240A a balanced three-phase winding configuration.

In a similar manner for the adjacent second stator module 240B, the set of stator windings 222B associated with the second stator module 240B includes one or more first windings 222B-A associated with first phase A, one or more second windings 222B-B associated with second phase B, and one or more third windings 222B-C associated with third phase C. Thus, in this example, the second stator module 240B acts as a three-phase electric machine. A go-side of the first winding 222B-A goes through one of the slots 230 labeled as A+, turns at end winding 236B-A, and a return-side of the first winding 222B-A returns through one of the slots 230 labeled as A−. Similarly, a go-side of the second winding 222B-B goes through one of the slots 230 labeled as B+, turns at end winding 236B-B, and a return-side of the second winding 222B-B returns through one of the slots 230 labeled as B−. Likewise, a go-side of the third winding 222B-C goes through one of the slots 230 labeled as C+, turns at end winding 236A-C, and a return-side of the third winding 222B-C returns through one of the slots 230 labeled as C−. The order of the stator windings 222B-A, 222B-B, and 222B-C gives the second stator module 240B a balanced three-phase winding configuration.

For the set of stator windings 222A, the end windings 236A-A, 236A-B, 236A-C of the respective first, second, and third windings 222A-A, 222A-B, 222A-C each turn at different planes with respect to each other. For instance, the end windings 236A-A, 236A-B, 236A-C can each turn at different planes along the axial direction A (FIG. 5) with respect to each other. Similarly, for the set of stator windings 222B, the end windings 236B-A, 236B-B, 236B-C of the respective first, second, and third windings 222B-A, 222B-B, 222B-C each turn at different planes with respect to each other.

In addition, an end winding associated with a given phase can turn at different planes from one stator module to the next. For instance, as shown in FIG. 7, the end winding 236A-A of the first stator module 240A, the end winding 236A-A being associated with phase A, turns at a different plane than the end winding 236B-A of the second stator module 240B, the end winding 236B-A being associated with phase A. Similarly, the end winding 236A-B of the first stator module 240A, the end winding 236A-B being associated with phase B, turns at a different plane than the end winding 236B-B of the second stator module 240B, the end winding 236B-B being associated with phase B. In this regard, the turn planes for the end windings associated with phases A and B can alternate every stator module. This may facilitate balancing end-winding impedance.

Moreover, as the stator windings go and return within the same stator module and in slots that are spaced from one another by more than slot, the windings are arranged in a distributed configuration in FIG. 7. For instance, the go-side of the first winding 222A-A is wound through slot A+, which spans three slots from slot A−. Likewise, the go-side of the second winding 222A-B is wound through slot B+, which spans three slots from slot B− and the go-side of the third winding 222A-C is wound through slot C+, which spans three slots from slot C−. The stator windings 222B are likewise arranged in a distributed configuration.

In other embodiments, the stator windings of a set associated with one of the stator modules can be arranged in a tooth or concentrated configuration. In such configurations, the go-side of a given winding is wound through a slot and the return-side of the given winding is wound through an adjacent slot. Thus, in a tooth or concentrated winding configuration, the stator windings go and return within the same stator module and in slots that are spaced from one another by only a single slot (i.e., they are adjacent slots).

It will be appreciated that the winding configurations disclosed above are non-limiting examples and that sets of stator windings associated with their respective stator modules can be wound in other suitable configurations.

Figure 8:
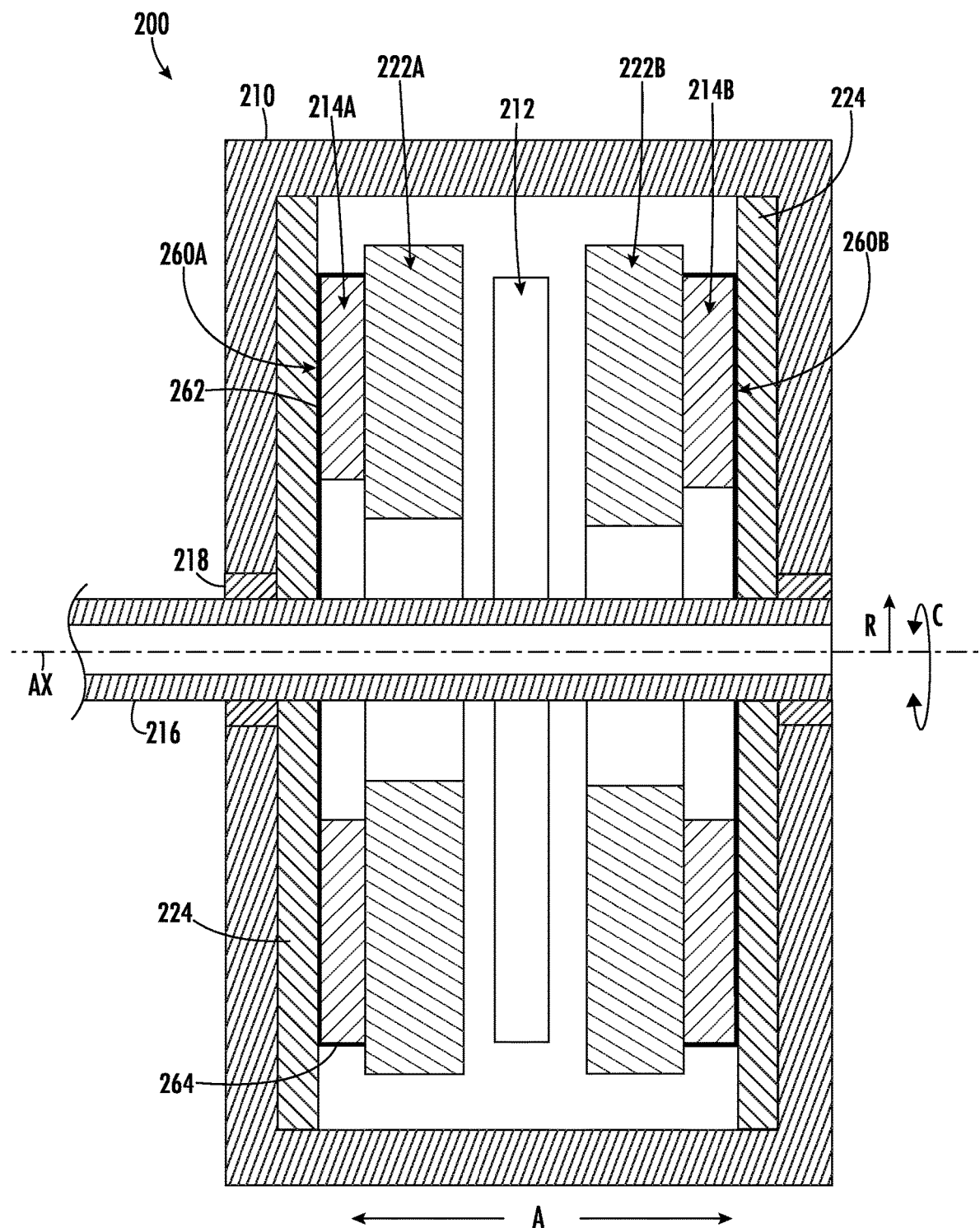
FIG. 8 provides a schematic cross-sectional view of an axial flux electric machine according to one example embodiment of the present subject matter.

FIG. 8 provides a schematic cross-sectional view of another example electric machine 200 according to an example embodiment of the present subject matter. As shown, for this embodiment, the electric machine 200 is an axial flux rotating electric machine. The inventive aspects provided herein can apply to axial flux electric machines in addition to radial flux electric machines. Accordingly, the advantages and benefits disclosed herein with respect to radial flux machines apply to axial flux machines as well.

As shown in FIG. 8, the electric machine 200 includes a rotor 212 and a stator, which includes a first stator 214A and a second stator 214B. The rotor 212 is operatively coupled with the shaft 216 and is rotatable about the axis of rotation AX in unison with the shaft 216. The first stator 214A is positioned on a first side of the rotor 212 and the second stator 214B is positioned on a second side of the rotor 212 opposite the first side. The first stator 214A has associated first stator windings 222A and the second stator 214B has associated second stator windings 222B.

Figure 9:
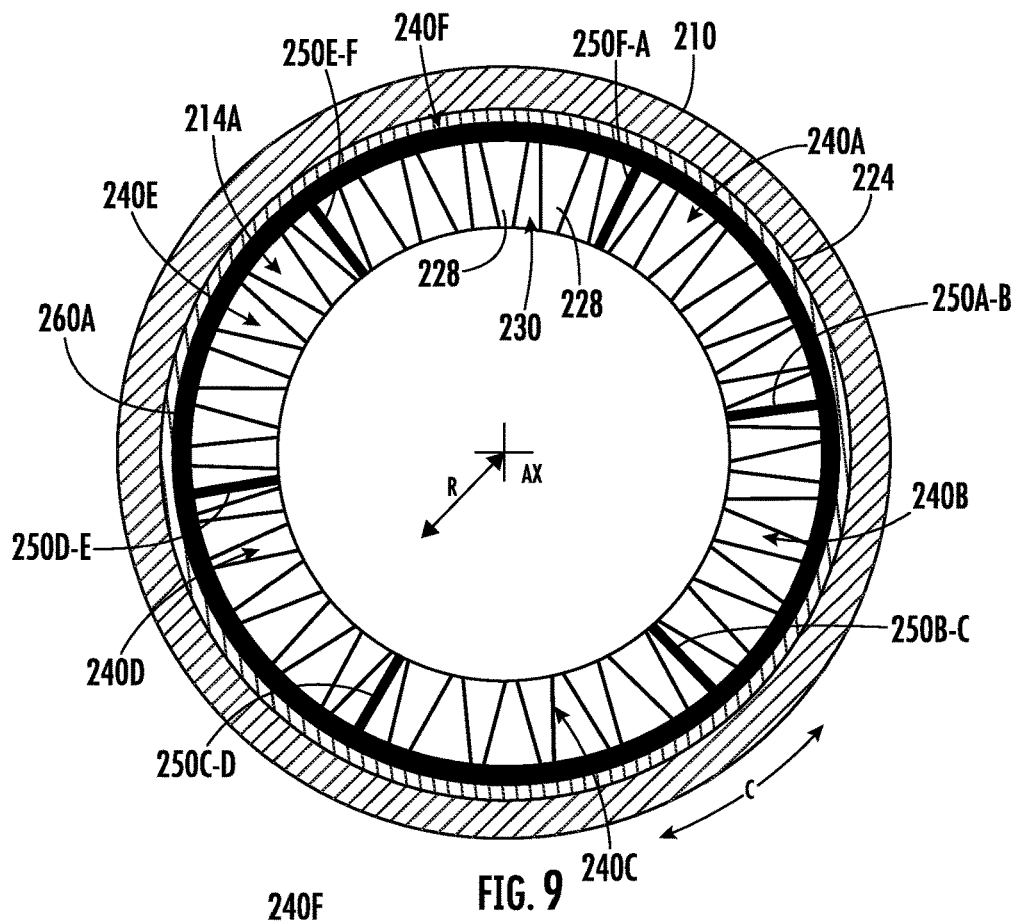
FIG. 9 provides a schematic cross-sectional view of a first stator of the electric machine of FIG. 8.
Figure 10:
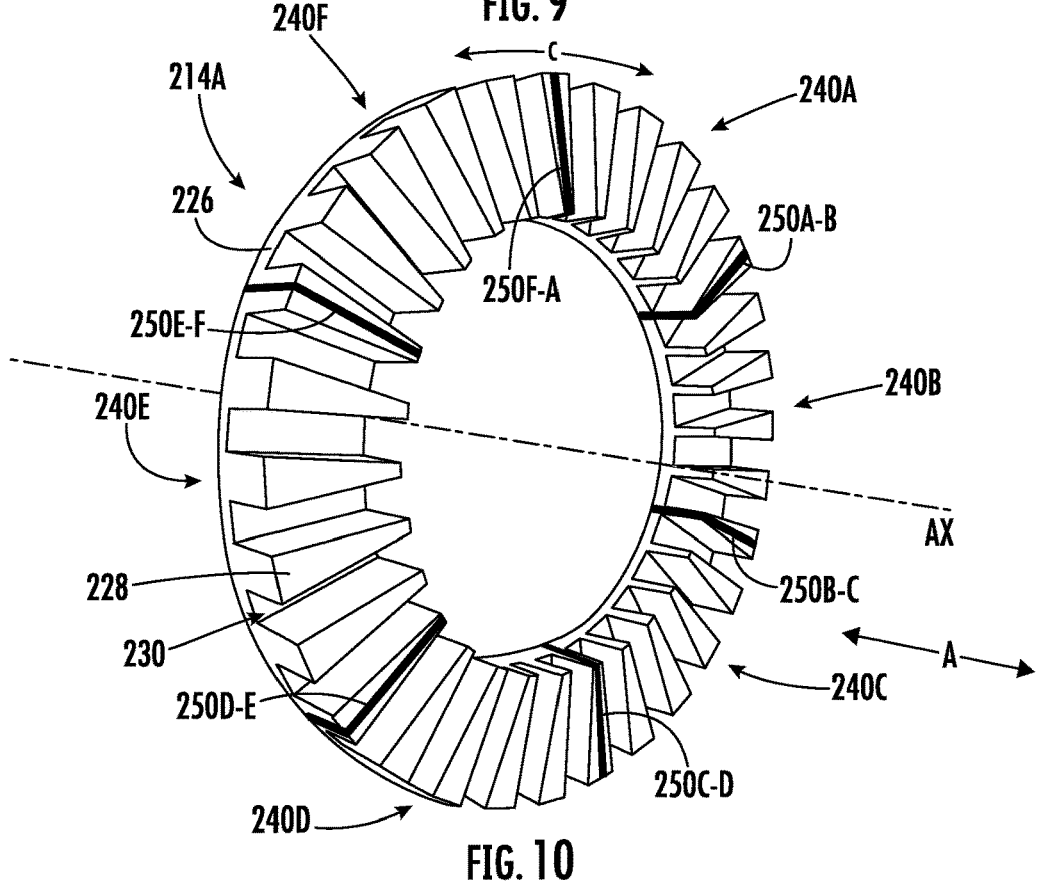
FIG. 10 provides a perspective view of the first stator depicted in FIG. 9.

With reference now to FIGS. 8, 9, and 10, FIG. 9 provides a schematic cross-sectional view of the first stator 214A of the electric machine 200 of FIG. 8 and FIG. 10 provides a perspective view of the first stator 214A. As shown, the first stator 214A includes a stator core having a core body 226 and a plurality of teeth 228 projecting from the core body 226. For this embodiment, the teeth 228 project inward from the core body 226 along the axial direction A toward the rotor 212 (FIG. 8). Slots 230 are defined between each of the teeth 228. The slots 230 are sized to receive stator windings (not shown in FIGS. 9 and 10).

Notably, for this embodiment, the axial flux electric machine 200 is equipped with galvanic separators for cascaded voltage stator modularization. As illustrated in FIGS. 9 and 10, there are six galvanically isolated stator modules, including a first stator module 240A, a second stator module 240B, a third stator module 240C, a fourth stator module 240D, a fifth stator module 240E, and a sixth stator module 240F. Each stator module 240A-240F has an associated set of first stator windings 222A (FIG. 8). The set of stator windings associated with a given stator module are wound only within the given stator module. For instance, the set of first stator windings 222A associated with the first stator module 240A are wound only within the first stator module 240A; none of the windings of the set cross over into another module. In some embodiments, the windings of each set of the first stator windings 222A and/or the windings of each set of the second stator windings 222B can be arranged in a distributed configuration. In some other embodiments, the windings of each set of the first stator windings 222A and/or the windings of each set of the second stator windings 222B can be arranged in a tooth or concentrated configuration.

A first intermodular separator 250A-B galvanically separates the first stator module 240A and the second stator module 240B, a second intermodular separator 250B-C galvanically separates the second stator module 240B and the third stator module 240C, a third intermodular separator 250C-D galvanically separates the third stator module 240C and the fourth stator module 240C, a fourth intermodular separator 250D-E galvanically separates the fourth stator module 240D and the fifth stator module 240E, a fifth intermodular separator 250E-F galvanically separates the fifth stator module 240E and the sixth stator module 240F, and a sixth intermodular separator 250F-A galvanically separates the sixth stator module 240F and the first stator module 240A. The intermodular separators 250A-B-250F-A generally extend in a plane orthogonal to the circumferential direction C and have a thickness along the circumferential direction C. The intermodular separators 250A-B-250F-A are positioned between their respective adjacent stator modules 240A-240F such that the stator modules 240A-240F are separated from one another along the circumferential direction C. In this manner, electric current is prevented from flowing circumferentially from one stator module to the next. The intermodular separators 250A-B-250F-A can be sized and can be formed with the materials noted herein. It will be appreciated that the second stator 214B can likewise include a plurality of stator modules galvanically isolated or separated by respective intermodular separators. For instance, the second stator 214B can be configured in the same or similar manner as the first stator 212A shown in FIGS. 9 and 10.

A first housing separator 260A galvanically separates the stator modules 240A-240F of the first stator module 214A from a housing 210 of the electric machine 200. The first housing separator 260A can be wrapped around an outer surface of the first stator 214A as shown in FIG. 8. Particularly, a first portion 262 or part of the first housing separator 260A can extend annularly along an axial outer surface of the first stator module 214A, with the thickness of the first portion 262 being along the axial direction A. A second portion 264 of the first housing separator 260A can extend annularly around the radially outer surface of the first stator module 214A, with the thickness of the second portion 264 being along the radial direction R. The first and second portions 262, 264 can be integral or can be distinct separate parts. The first housing separator 260A can be sized and can be formed with the materials noted herein. The first housing separator 260A can directly contact the cooling jacket 224, which in turn can directly contact the housing 210 as shown in FIG. 8. In other embodiments, the cooling jacket 224 may not be present and the first housing separator 260A can directly contact the housing 210.

Further, a second housing separator 260B galvanically separates the stator modules of the second stator module 214B from the housing 210 of the electric machine 200. The second housing separator 260B can be configured, oriented, positioned, and/or otherwise arranged with respect to the second stator module 214B in the same manner as the first housing separator 260A is configured, oriented, positioned, and/or otherwise arranged with respect to the first stator module 214A. The second housing separator 260B can directly contact the cooling jacket 224, which in turn can directly contact the housing 210 as shown in FIG. 8. In other embodiments, the cooling jacket 224 may not be present and the second housing separator 260B can directly contact the housing 210.

Although electric machines equipped with galvanic separators for cascaded voltage stator modularization are disclosed herein in the context of aviation applications, it will be appreciated that such electric machines are suitable for use in other applications and in other industries as well. Moreover, although an electric machine equipped with galvanic separators for cascaded voltage stator modularization is disclosed herein in a particular example power distribution system for an aircraft, it will be appreciated that such electric machines can be used in other suitable high voltage power distribution systems as well. For instance, such electric machines can be used in any of the power distribution systems disclosed in U.S. patent application Ser. No. 15/666,173, filed Aug. 1, 2017 and published on Feb. 7, 2019 as US2019/0044451, which is incorporated by reference herein in its entirety. In addition, although the windings discussed herein were provided in the context of being three-phase windings, it will be appreciated that the inventive aspects of the present disclosure apply to any multi-phase winding arrangement having any suitable number of phases, such as six-phase windings. For instance, each stator module can have an associated set of six-phase windings instead of an associated set of three-phase windings.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

Further aspects of the invention are provided by the subject matter of the following clauses:

1. An electric machine, comprising: a stator having stator modules; a housing encasing at least a portion of the stator; a housing separator galvanically isolating the housing from the stator modules; and intermodular separators galvanically isolating the stator modules from one another.

2. The electric machine of any preceding clause, wherein the electric machine defines an axial direction, a radial direction, and a circumferential direction, and wherein, for each pair of adjacent stator modules, an intermodular separator of the intermodular separators is positioned therebetween.

3. The electric machine of any preceding clause, wherein the stator has a core body and teeth projecting therefrom along the radial direction, a radial length of the stator being defined from an outer surface of the core body to an inner end of one of the teeth along the radial direction, and wherein each one of the intermodular separators extends the radial length between its respective adjacent stator modules.

4. The electric machine of any preceding clause, wherein the stator extends between a first end and a second end along the axial direction, and wherein each one of the intermodular separators extends from the first end to the second end of the stator along the axial direction.

5. The electric machine of any preceding clause, wherein the electric machine defines an axial direction, a radial direction, and a circumferential direction, and wherein the intermodular separators are positioned between the stator modules such that the stator modules are separated from one another along the circumferential direction.

6. The electric machine of any preceding clause, wherein the electric machine defines an axial direction, a radial direction, and a circumferential direction, and wherein the intermodular separators are positioned between the stator modules such that the stator modules are separated from one another along the axial direction.

7. The electric machine of any preceding clause, wherein the electric machine defines an axial direction, a radial direction, and a circumferential direction, and wherein the housing separator extends annularly around the stator along the circumferential direction and is positioned between the stator modules and the housing along the radial direction.

8. The electric machine of any preceding clause, wherein at least one of the housing separator and the intermodular separators are formed of barium ferrite.

9. The electric machine of any preceding clause, wherein the intermodular separators each have a thickness in a range of 25-250 microns.

10. The electric machine of any preceding clause, wherein the housing separator has a thickness in a range of 250 microns-2.5 mm.

11. The electric machine of any preceding clause, wherein each one of the stator modules has an associated set of stator windings, and wherein the stator windings of each set are wound only within their respective stator modules.

12. The electric machine of any preceding clause, wherein the stator windings of each set are arranged in a distributed configuration.

13. The electric machine of any preceding clause, wherein the stator windings of each set include first windings associated with a first phase, second windings associated with a second phase, and third windings associated with a third phase, and wherein the first, second, and third windings each have end windings that turn at different planes with respect to each other.

14. The electric machine of any preceding clause, wherein the stator modules have successively changing associated voltage ranges.

15. A power distribution system, comprising: a high voltage power bus operable to carry high voltage electrical power; power converters electrically coupled with the high voltage power bus and operable to segment the high voltage electrical power; an electric machine, comprising: a stator having stator modules; a housing encasing at least a portion of the stator; a housing separator galvanically isolating the housing from the stator modules; and intermodular separators galvanically isolating the stator modules from one another, and wherein each one of the stator modules is electrically coupled with a respective one of the power converters, and wherein each one of the stator modules receives a portion of the segmented high voltage electrical power.

16. The power distribution system of any preceding clause, wherein the high voltage power bus is a unipolar high voltage power bus.

17. The power distribution system of any preceding clause, wherein the high voltage power bus is a bipolar high voltage power bus.

18. The power distribution system of any preceding clause, wherein the stator modules include a highest voltage stator module having an associated voltage range higher than any other voltage range associated with any other one of the stator modules and a lowest voltage stator module having an associated voltage range lower than any other voltage range associated with any other one of the stator modules, and wherein a voltage associated with the housing is a median value between a maximum voltage associated with the highest voltage stator module and a lowest voltage associated with the lowest voltage stator module.

19. The power distribution system of any preceding clause, wherein the stator modules are electrically coupled with their respective power converters in a cascade arrangement.

20. An aircraft, comprising: a high voltage power bus operable to carry high voltage electrical power; power converters electrically coupled with the high voltage power bus and operable to segment the high voltage electrical power; an electric machine, comprising: a stator having stator modules; a housing encasing at least a portion of the stator; a housing separator galvanically isolating the housing from the stator modules; and intermodular separators galvanically isolating the stator modules from one another, and wherein each one of the stator modules is electrically coupled with a respective one of the power converters, and wherein each of the stator modules receives a portion of the segmented high voltage electrical power and each of the stator modules is at an independent voltage with respect to each other.

What is claimed is:

1. An electric machine, comprising:
    a stator having stator modules;
    a housing encasing at least a portion of the stator;
    a housing separator galvanically isolating the housing from the stator modules; and
    intermodular separators galvanically isolating the stator modules from one another, and
    wherein each one of the stator modules is associated with a different voltage range.

2. The electric machine of claim 1, wherein the electric machine defines an axial direction, a radial direction, and a circumferential direction, and wherein, for each pair of adjacent stator modules, an intermodular separator of the intermodular separators is positioned therebetween.

3. The electric machine of claim 2, wherein the stator has a core body and teeth projecting therefrom along the radial direction, a radial length of the stator being defined from an outer surface of the core body to an inner end of one of the teeth along the radial direction, and wherein each one of the intermodular separators extends the radial length between its respective adjacent stator modules.

4. The electric machine of claim 3, wherein the stator extends between a first end and a second end along the axial direction, and wherein each one of the intermodular separators extends from the first end to the second end of the stator along the axial direction.

5. The electric machine of claim 1, wherein the electric machine defines an axial direction, a radial direction, and a circumferential direction, and wherein the intermodular separators are positioned between the stator modules such that the stator modules are separated from one another along the circumferential direction.

6. The electric machine of claim 1, wherein the electric machine is an axial flux electric machine.

7. The electric machine of claim 1, wherein the electric machine defines an axial direction, a radial direction, and a circumferential direction, and wherein the housing separator extends annularly around the stator along the circumferential direction and is positioned between the stator modules and the housing along the radial direction.

8. The electric machine of claim 1, wherein at least one of the housing separator and the intermodular separators are formed of barium ferrite.

9. The electric machine of claim 1, wherein the intermodular separators each have a thickness in a range of 25-250 microns.

10. The electric machine of claim 1, wherein the housing separator has a thickness in a range of 250 micron-2.5 mm.

11. The electric machine of claim 1, wherein each one of the stator modules has an associated set of stator windings, and wherein the stator windings of each set are wound only within their respective stator modules.

12. The electric machine of claim 11, wherein the stator windings of each set are arranged in a distributed configuration.

13. The electric machine of claim 12, wherein the stator windings of each set include first windings associated with a first phase, second windings associated with a second phase, and third windings associated with a third phase, and wherein the first, second, and third windings each have end windings that turn at different planes with respect to each other.

14. The electric machine of claim 1, wherein the stator modules have successively changing associated voltage ranges.

15. A power distribution system, comprising:
    a high voltage power bus operable to carry high voltage electrical power;
    power converters electrically coupled with the high voltage power bus and operable to segment the high voltage electrical power;
    an electric machine, comprising:
        a stator having stator modules;
        a housing encasing at least a portion of the stator;
        a housing separator galvanically isolating the housing from the stator modules; and
        intermodular separators galvanically isolating the stator modules from one another, and
    wherein each one of the stator modules is electrically coupled with a respective one of the power converters, and wherein each one of the stator modules receives a portion of the segmented high voltage electrical power, wherein each one of the stator modules is associated with a different voltage range.

16. The power distribution system of claim 15, wherein the high voltage power bus is a unipolar high voltage power bus.

17. The power distribution system of claim 15, wherein the high voltage power bus is a bipolar high voltage power bus.

18. The power distribution system of claim 17, wherein the stator modules include a highest voltage stator module having an associated voltage range higher than any other voltage range associated with any other one of the stator modules and a lowest voltage stator module having an associated voltage range lower than any other voltage range associated with any other one of the stator modules, and wherein a voltage associated with the housing is a median value between a maximum voltage associated with the highest voltage stator module and a lowest voltage associated with the lowest voltage stator module.

19. The power distribution system of claim 15, wherein the stator modules are electrically coupled with their respective power converters in a cascade arrangement.

20. An aircraft, comprising:

a high voltage power bus operable to carry high voltage electrical power;

power converters electrically coupled with the high voltage power bus and operable to segment the high voltage electrical power;

an electric machine, comprising:

a stator having stator modules;

a housing encasing at least a portion of the stator;

a housing separator galvanically isolating the housing from the stator modules; and intermodular separators galvanically isolating the stator modules from one another, and wherein each one of the stator modules is electrically coupled with a respective one of the power converters, and wherein each of the stator modules receives a portion of the segmented high voltage electrical power and each of the stator modules is associated with a different voltage range.

* * * * *